United States Patent [19]

Stroud

[11] Patent Number: 4,509,005
[45] Date of Patent: Apr. 2, 1985

[54] DUAL ALTERNATOR SYSTEM

[76] Inventor: Lebern W. Stroud, 321 Charleston Pl., Hurst, Tex. 76053

[21] Appl. No.: 398,557

[22] Filed: Jul. 15, 1982

[51] Int. Cl.³ .............................................. H02J 7/00
[52] U.S. Cl. ...................................... 320/68; 320/39; 320/56; 320/DIG. 1; 307/84
[58] Field of Search .................... 320/39, 56, 61, 64, 320/65, 68, DIG. 1; 322/88, 89, 90, 28; 307/16, 18, 57, 84, 64

[56] References Cited
U.S. PATENT DOCUMENTS

| 3,443,193 | 5/1969 | Wright | 320/DIG. 1 |
| 3,809,996 | 5/1974 | Meisenheimer | 322/28 |
| 4,336,485 | 6/1982 | Stroud | 320/15 |

Primary Examiner—R. Skudy
Assistant Examiner—Anita M. Ault
Attorney, Agent, or Firm—Arthur F. Zobal

[57] ABSTRACT

Two alternators of a motor vehicle are operated in parallel from current supplied from a battery by way of two transistors respectively. A regulator senses the voltage output of the battery to control the two transistors.

9 Claims, 1 Drawing Figure

DUAL ALTERNATOR SYSTEM

SUMMARY OF THE INVENTION

It is an object of the present invention to provide a system wherein two alternators of a motor vehicle are operated from the current supplied to their rotors from a battery by way of two transistors respectively. A regulator senses the voltage output of the battery to control the two transistors.

DESCRIPTION OF THE PREFERRED EMBODIMENT

Figure 1:
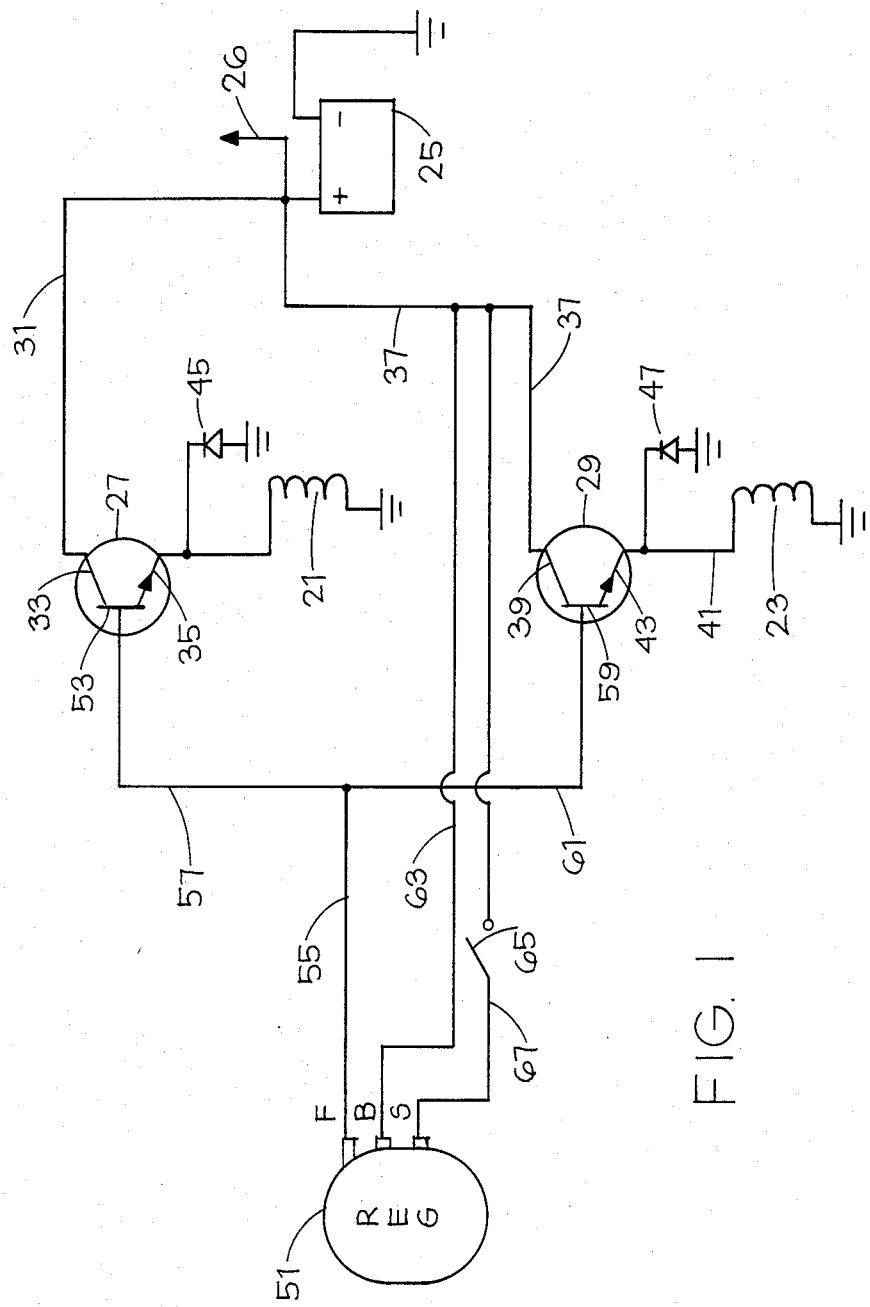
FIG. 1 is an electrical schematic of the present invention.

Referring now to FIG. 1, there is illustrated two rotor coils 21 and 23 of two alternators respectively of an emergency vehicle. The alternators are employed for charging a twelve volt battery 25 of the vehicle and for supplying power to a load (not shown) as described in connection with FIG. 2 of U.S. Pat. No. 4,336,485. This patent is hereby incorporated by reference into the present application. The emergency vehicle may be for example, an ambulance. The battery 25 supplies power to the vehicle chassis electrical system by way of lead 26. The plus terminal of battery 25 is connected to the rotors 21 and 23 by way of two identical power transistors 27 and 29 respectively. Electrical lead 31 connects the plus terminal of battery 25 to the collector 33 of transistor 27 and electrical lead 33 connects the emitter 35 of transistor 27 to rotor 21. Electrical lead 37 connects the plus terminal 25 of the battery 25 to the collector 39 of transistor 29 and electrical lead 41 connects the emitter 43 of transistor 29 to the rotor 23. The diodes 45 and 47 are provided to eliminate the reactance from the rotor 21 and 23 respectively.

A regulator 51 is provided having its F terminal connected to the base 53 of transistor 27 by way of electrical leads 55 and 57 and to the base 59 of transistor 29 by way of electrical leads 55 and 61. The B terminal of regulator 51 is connected to the plus terminal of the battery 25 by way of leads 63 and 37. A start switch 65 is provided in lead 67 which is coupled from the S terminal of regulator 51 to lead 37 and hence to the plus terminal of the battery 25. The regulator 51 may be set for example to regulate the output of the battery 25 such that it does not exceed 14.5 volts.

In operation, the switch 65 is closed. Current to the bases 53 and 59 of transistors 27 and 29 from the F terminal of regulator 51 causes the transistors to conduct whereby current flows to the rotors 21 and 23 from the battery 25 by way of the transistors 27 and 29. If the voltage on the B terminal of the regulator 51 reaches 14.5 volts, the voltage on the F terminal of regulator 51 drops whereby transistors 27 and 29 become less conductive and less current from the battery 25 flow to the rotors 21 and 23. This reduces the charging current to the battery 25.

In the system of FIG. 1 a single regulator is employed for regulating two alternators connected together in parallel. The use of the two transistors 27 and 29 has advantages since they provide the same amount of current from the battery to the two rotors of the alternators. The same amount of output current and voltage also are obtained from the two alternators for charging purposes and for supplying power to the load. The two alternators thus are balanced whereby one alternator does not become predominate which is undesirable since the predominate alternator will wear out before the other alternator. Since current to the two rotors from the battery flows by way of the two transistors 27 and 29 rather than from the regulator 51, high current requirements by the two alternators will not burn out the regulator 51. In one embodiment, each of the transistor is rated at 30 amps. They protect the regulator 51 in that only about 40 mils of current is drawn by the regulator output to control the two transistors. If one transistor fails, the other transistor and alternator provide a back up for charging the battery and for providing power to the load.

I claim:

1. A dual alternator system in a motor vehicle, comprising:

a regulator having first and second terminals, first and second transistors, first and second alternators having first and second rotors respectively, a battery, means for connecting said first terminal of said regulator to the bases of said first and second transistors, means for connecting said second terminal of said regulator to the plus terminal of said battery, means for connecting the collectors of said first and second transistors to the plus terminal of said battery, means for connecting the emitter of said first transistor to said first rotor for supplying current to said first rotor from said battery by way of said first transistor, and means for connecting the emitter of said second transistor to said second rotor for supplying current to said second rotor from said battery by way of said second transistor, said regulator sensing the voltage output of said battery by way of said second terminal and controlling said two transistors by way of said first terminal.

2. A dual alternator system in a motor vehicle, comprising:

a regulator having first and second terminals, first and second transistors, firsr and second alternators having first and second rotors respectively, a battery having a plus terminal and a minus terminal, said minus terminal of said battery being connected to ground, means for connecting said first terminal of said regulator to the bases of said first and second transistors, means for connecting said second terminal of said regulator to the plus terminal of said battery, means fo connecting the collectors of said first and second transistors to the plus terminal of said battery, means for collecting said emitter of said first transistor to one side of said first rotor the other side of said first rotor being connected to ground, and means for collecting the emitter of said second transistor to one side of said second rotor, the other side of said second rotor being connected to ground, said regulator sensing the output of said battery by way of said second terminal and controlling said two transistors by way of said first terminal to control the output of said battery.

3. The dual alternator system of claim 2, wherein:

said first transistor provides a current flow path between said one side of said rotor and said battery when said first transistor is conductive, said second transistor provides a current flow path between said one side of said second rotor and said battery when said second transistor is conductive, said regulator senses the output of said battery by way of said second terminal and controls the conduction of said two transistors by way of said first terminal to control the output of said battery.

4. The dual alternator system of claim 3, wherein:

said regulator senses the voltage output of said battery by way of said second terminal and controls the conduction of said two transistors by way of said first terminal to control the voltage output of said battery such that when the voltage output of said battery reaches a given level, said regulator produces an output on said first terminal which renders said two transistors less conductive thereby causing the voltage output of said battery to be reduced.

5. The dual alternator system of claim 5, wherein:

each of said first and second tranistors is an NPN transistor.

6. The dual alternator system of claim 2, wherein said first and second transistors comprise NPN transistors.

7. A dual alternator system of a motor vehicle, comprising:

a regulator having first and second terminals, first and second transistors, each of said first and second transistors having first, second, and third electrodes, said third electrode being employed as a control electrode, first and second alternators having first and second rotors respectively, a battery having a plus terminal and a minus terminal, said minus terminal of said battery beiing connected to ground, means for connecting said first terminal of said regulator to said third electrodes of said first and second transistors, means for connecting said second terminal of said regulator to the plus terminal of said battery, means for connecting the first electrodes of said first and second transistors to the plus terminal of said battery, means for connecting the second electrode of said first transistor to one side of said first rotor, the other side of said first rotor being connected to ground, and means for connecting the second electrode of said second transistor to one side of said second rotor, the other side of said second rotor being connected to ground, said regulator sensing the output of said battery by way of said second terminal and controlling said two transistors by way of said first terminal to control the output of said battery.

8. The dual alternator system of claim 7, wherein:

said first transistor provides a current flow path between said first one side of said rotor and said battery when said first transistor is conductive, said second transistor provides a current flow path between said second one side of said rotor and said battery when said second transistor is conductive, said regulator senses the output of said battery by way of said second terminal and controls the conduction of said two transistors by way of said first terminal to control the output of said battery.

9. The dual alternator system of claim 8, wherein:

said regulator senses the voltage output of said battery by way of said second terminal and controls the conduction of said two transistors by way of said first terminal to control the voltage output of said battery such that when the voltage output of said battery reaches a given level, said regulator produces an output on said first terminal which renders said two transistors less conductive thereby causing the voltage output of said battery to be reduced.

* * * * *